US007720599B2

(12) United States Patent
Miyawaki et al.

(10) Patent No.: US 7,720,599 B2
(45) Date of Patent: May 18, 2010

(54) TOURIST INFORMATION GUIDING APPARATUS

(75) Inventors: Hisashi Miyawaki, Wakayama (JP); Nobuo Nakashima, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 604 days.

(21) Appl. No.: 11/212,102

(22) Filed: Aug. 26, 2005

(65) Prior Publication Data

US 2006/0058956 A1 Mar. 16, 2006

(30) Foreign Application Priority Data

Sep. 1, 2004 (JP) ............................ 2004-254583

(51) Int. Cl.
*G01C 21/00* (2006.01)
*G01C 21/30* (2006.01)

(52) U.S. Cl. ....................................... 701/211; 701/200

(58) Field of Classification Search ................. 701/200, 701/211; 340/995.24, 995.26
See application file for complete search history.

(56) References Cited

U.S. PATENT DOCUMENTS

| | | | | |
|---|---|---|---|---|
| 5,751,228 | A * | 5/1998 | Kamiya et al. | 340/988 |
| 5,774,828 | A * | 6/1998 | Brunts et al. | 701/210 |
| 5,806,018 | A * | 9/1998 | Smith et al. | 701/211 |
| 5,850,618 | A * | 12/1998 | Suetsugu et al. | 701/210 |
| 6,360,164 | B1 * | 3/2002 | Murayama | 701/200 |
| 6,529,819 | B2 * | 3/2003 | Baur et al. | 701/117 |
| 6,542,814 | B2 * | 4/2003 | Polidi et al. | 701/208 |
| 6,678,609 | B1 * | 1/2004 | Duckeck et al. | 701/200 |
| 6,697,731 | B2 * | 2/2004 | Takayama et al. | 701/200 |
| 6,738,711 | B2 * | 5/2004 | Ohmura et al. | 701/208 |
| 6,928,364 | B2 * | 8/2005 | Tsuyuki | 701/200 |
| 6,944,539 | B2 * | 9/2005 | Yamada et al. | 701/211 |
| 6,973,387 | B2 * | 12/2005 | Masclet et al. | 701/211 |
| 7,071,842 | B1 * | 7/2006 | Brady, Jr. | 340/988 |
| 7,133,771 | B1 * | 11/2006 | Nesbitt | 701/202 |

(Continued)

FOREIGN PATENT DOCUMENTS

DE 298 16 766 U 4/1999

(Continued)

OTHER PUBLICATIONS

Notice of Reasons for Rejection directed to Japanese Patent Application No. 2004-254583, dated Dec. 11, 2009; 3 pages.

*Primary Examiner*—Mark Hellner
*Assistant Examiner*—Helal A Algahaim
(74) *Attorney, Agent, or Firm*—Smith Patent Office

(57) ABSTRACT

A tourist information guiding apparatus is provided with a tourist spot information storage storing image data relating to tourist spots in correspondence with character string data for sightseeing guide written in a plurality of languages, a monitor for displaying operation screens used to input various instructions such as the display of tourist information, a language receiving section for receiving the selection of a language via the operation screen on the monitor, a tourist spot receiving section for receiving the selection of a tourist spot, and a display controlling section for causing the monitor to display an image of the tourist spot selected by the tourist spot receiving section together with a character string for sightseeing guide written in the language designated by the language receiving section. A traveler can obtain tourist information in his native language at a travel destination by means of a tourist information guiding apparatus.

16 Claims, 15 Drawing Sheets

U.S. PATENT DOCUMENTS

| | | | | |
|---|---|---|---|---|
| 7,289,812 | B1 * | 10/2007 | Roberts et al. | 455/456.1 |
| 7,321,824 | B1 * | 1/2008 | Nesbitt | 701/201 |
| 2003/0164822 | A1 | 9/2003 | Okada | |
| 2004/0210444 | A1 * | 10/2004 | Arenburg et al. | 704/277 |
| 2005/0165541 | A1 * | 7/2005 | Noguchi et al. | 701/200 |
| 2005/0197825 | A1 * | 9/2005 | Hagerman et al. | 704/2 |

FOREIGN PATENT DOCUMENTS

| | | | | |
|---|---|---|---|---|
| EP | 1 085 477 | A | | 3/2001 |
| FR | 2 330 088 | A | | 5/1977 |
| JP | 10016444 | A | * | 1/1998 |
| JP | 11-219105 | A | | 8/1999 |
| JP | 2002-259417 | A | | 9/2002 |
| JP | 2003-030287 | A | | 1/2003 |
| JP | 2003-214889 | A | | 7/2003 |
| WO | WO 2004/064022 | A | | 7/2004 |

* cited by examiner

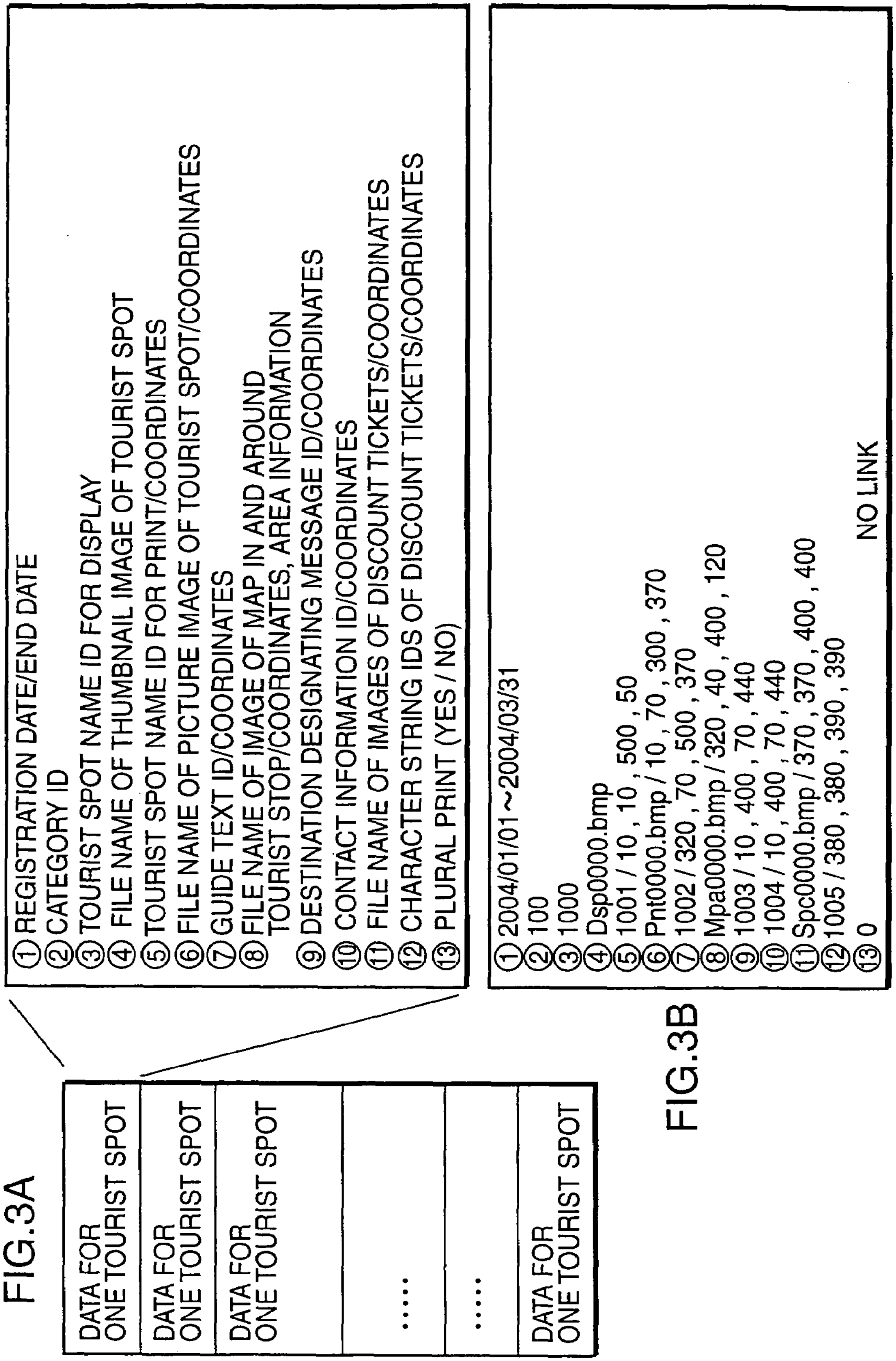
FIG.3A
DATA FOR ONE TOURIST SPOT
DATA FOR ONE TOURIST SPOT
DATA FOR ONE TOURIST SPOT
......
......
DATA FOR ONE TOURIST SPOT
① REGISTRATION DATE/END DATE
② CATEGORY ID
③ TOURIST SPOT NAME ID FOR DISPLAY
④ FILE NAME OF THUMBNAIL IMAGE OF TOURIST SPOT
⑤ TOURIST SPOT NAME ID FOR PRINT/COORDINATES
⑥ FILE NAME OF PICTURE IMAGE OF TOURIST SPOT/COORDINATES
⑦ GUIDE TEXT ID/COORDINATES
⑧ FILE NAME OF IMAGE OF MAP IN AND AROUND TOURIST STOP/COORDINATES, AREA INFORMATION
⑨ DESTINATION DESIGNATING MESSAGE ID/COORDINATES
⑩ CONTACT INFORMATION ID/COORDINATES
⑪ FILE NAME OF IMAGES OF DISCOUNT TICKETS/COORDINATES
⑫ CHARACTER STRING IDS OF DISCOUNT TICKETS/COORDINATES
⑬ PLURAL PRINT (YES / NO)
FIG.3B
① 2004/01/01～2004/03/31
② 100
③ 1000
④ Dsp0000.bmp
⑤ 1001 / 10 , 10 , 500 , 50
⑥ Pnt0000.bmp / 10 , 70 , 300 , 370
⑦ 1002 / 320 , 70 , 500 , 370
⑧ Mpa0000.bmp / 320 , 40 , 400 , 120
⑨ 1003 / 10 , 400 , 70 , 440
⑩ 1004 / 10 , 400 , 70 , 440
⑪ Spc0000.bmp / 370 , 370 , 400 , 400
⑫ 1005 / 380 , 380 , 390 , 390
⑬ 0
NO LINK

FIG.5A

1000,～～Kaigan
1001,～～Kaigan
1002,×××××××××××××××××××××××××××××××××××
1003,××××××××
1004,Wakayamasi
1005, 10% OFF

FIG.5B

1000,～～BEACH
1001,～～BEACH
1002,××××××××××××××××××××××××××
1003, PLEASE GO TO XXX BEACH
1004,WAKAYAMA-CITY…
1005, 10% OFF

FIG.6
GUIDE SCREEN FOLDER
GUIDE SCREEN FOLDER A
GUIDE SCREEN FOLDER B
RELATED INFORMATION FILE
ENGLISH FILE
JAPANESE FILE

TOURIST INFORMATION GUIDING APPARATUS

FIELD OF THE INVENTION

The present invention relates to a tourist information guiding apparatus for displaying an image relating to a tourist spot together with a character string for sightseeing guide on a monitor.

BACKGROUND ART

Conventionally, foreign travelers have, in many cases, purchased guidebooks in their own countries, checked tourist information such as famous tourist meccas, hotels, restaurants at destinations, and headed for the destinations on their journeys while referring to maps to the destinations written in the guidebooks and transportation guides.

However, maps to destinations and transportation guides are written not in Japanese, but in foreign languages in the guidebooks purchased in foreign countries. Thus, frequently, travelers cannot easily arrive at destinations even if they show these maps and transportation guides to taxi drivers or other people there upon heading for the destinations. On the other hand, since sightseeing guide brochures for tourists handed out at hotels and the like in Japan are written in Japanese, they cannot be easily understood by foreign travelers even if the foreign travelers see them. Such problems similarly occur when Japanese travel abroad.

Since an amount of information for each destination is limited in the guidebooks or sightseeing guide brochures, no detailed tourist information can be obtained. Further, the guidebooks or sightseeing guide brochures need to be reprinted in the case of updating information, and those having been used till then are discarded. This leads to a problem of wasting resources.

SUMMARY OF THE INVENTION

It is an object of the present invention to provide a tourist information guiding apparatus which is free from the problems residing in the prior art.

It is another object of the present invention to provide a tourist information guiding apparatus which enables a traveler to obtain tourist information in his/her native languages in a country of his destination.

It is still another object of the present invention to provide a tourist information guiding apparatus which can output a sightseeing guide print bearing tourist information, such as transportation guide, written in the native language of a tourist and in local language.

According to an aspect of the present invention, a tourist information guiding apparatus is provided with a tourist spot information storage device for storing image data relating to tourist spots in correspondence with character string data for sightseeing guide written in a plurality of languages, a monitor provided on an apparatus main body, a tourist spot receiver provided in the apparatus main body for receiving the selection of a tourist spot, a language receiver provided in the apparatus main body for receiving the selection of a language, and a display controller for causing the monitor to display an image relating to the tourist spot selected by the tourist spot receiver together with a character string for sightseeing guide written in the language designated by the language receiver.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 3A is a data configuration diagram showing a number of pieces of administration information saved in an administration information storage;

FIG. 3B is a diagram showing specific examples of the administration information;

FIGS. 5A and 5B are data configuration diagrams showing character information files included in a tourist spot information folder;

DETAILED DESCRIPTION OF THE PREFERRED EMBODIMENTS OF THE INVENTION

Figure 1:
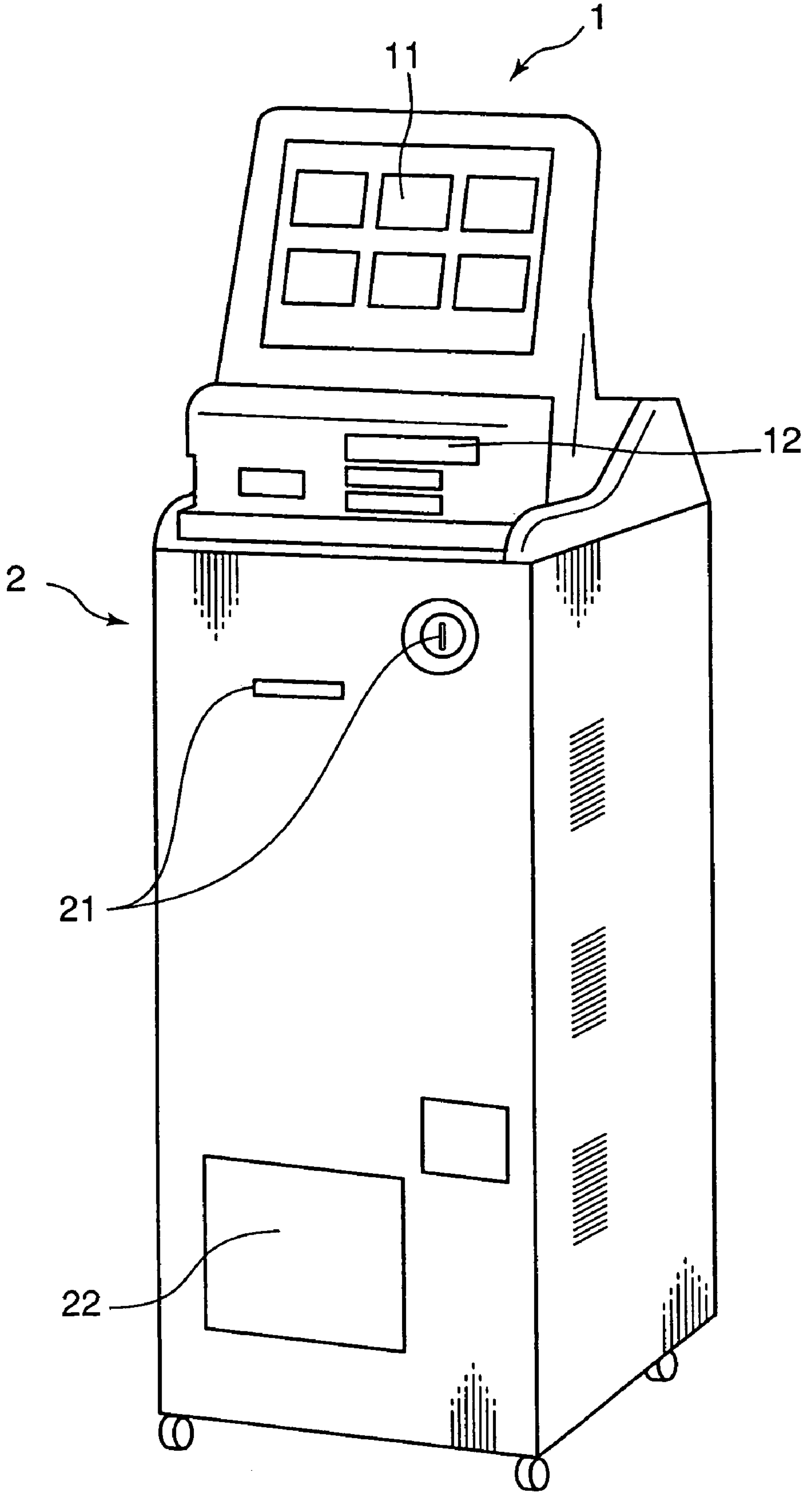
FIG. 1 is a perspective view showing an external configuration of a picture processing apparatus according to an embodiment of the invention.

Referring to FIG. 1 showing an external configuration of a picture processing apparatus according to an embodiment of the present invention, the picture processing apparatus is provided with a receiving unit 1 and a printing unit 2. The receiving unit 1 includes a monitor 11 for displaying tourist information and operation screens used to input various instructions upon printing the tourist information, and an image importing device 12 constructed such that a plurality of kinds of media such as CD-R/RWs (CD recordable/rewritables) and small-size memory cards including smart media (registered trademark) can be insertable thereinto and ejectable therefrom, and adapted to import image data to be saved in the respective media. The monitor 11 is constructed, for example, by a touch panel device which is a combination of a touch panel and a LCD (liquid crystal display), and displays various operation screens and operation keys used for a user to input various operation commands by touching.

The printing unit 2 has a built-in thermal transfer printer 23 (hereinafter, merely "printer") for the print output of tourist spot information displayed on the monitor 11 and/or an image data imported from the medium via the image importing device 12. The printing unit 2 has, on the front surface of its casing, coin and bill slots 21 for receiving the payment of charge for a print order, and a print slot 22 for taking out a sightseeing guide print printed by the printer 23.

Figure 2:
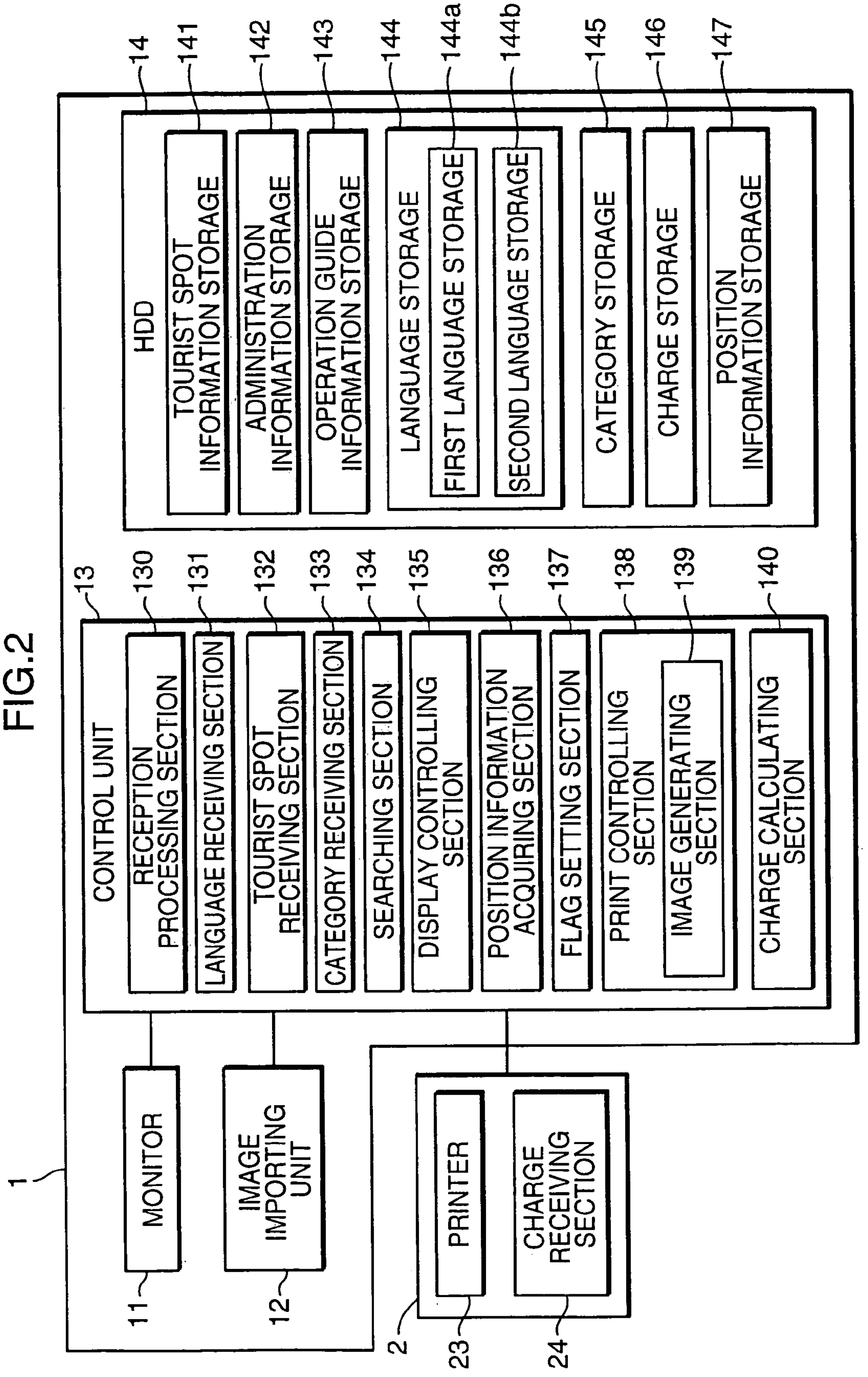
FIG. 2 is a block diagram showing the construction of the picture processing apparatus.

FIG. 2 is a block diagram showing the construction of the picture processing apparatus. A control unit 13 controls the operation of the entire picture processing apparatus. The control unit 13 is provided with an unillustrated CPU (central processing unit), an unillustrated RAM (random access memory) for temporarily saving data being processed, and an unillustrated ROM (read-only memory) storing a program for controlling various operations of the picture processing apparatus, screen data forming various images and the like beforehand.

A hard disk device (HDD) 14 is provided with a tourist spot information storage 141, an administration information storage 142, an operation guide information storage 143, a language storage 144, a category storage 145, a charge information storage 146 and a position information storage 147. The tourist spot information storage 141 stores tourist spot information, i.e. image data relating to the respective tourist spots in correspondence with character string data for sightseeing guide written in a plurality of languages. The administration information storage 142 stores administration information relating to the display of the tourist spot information on the monitor 11 and the printing of the tourist spot information for each tourist spot. The operation guide information storage 143 stores character string data for operation guides to be displayed on a guide screen for the tourist spot information (hereinafter, also referred to as "operation guide information"). The language storage 144 stores language information selected by a language receiving section 131 to be described later. The category storage 145 stores category information indicating types of the tourist spots such as hotels and tourist meccas selected as objects to be searched upon the category search of a number of pieces of tourist spot information. The charge information storage 146 stores charge information calculated by a unit print price and the number of prints to be made. The position information storage 147 stores position information indicating the place of installation of the picture processing apparatus.

The language storage 144 includes a first language storage **144*a* storing local language information indicating a local language used at the place of installation of this picture processing apparatus, and a second language storage 144*b* storing display language information indicating a display language of guide screens of the tourist spot information to be displayed on the monitor 11 or the sightseeing guide print printed by the printer 23**.

FIG. 3A is a data configuration diagram showing a number of pieces of administration information saved in the administration information storage 142, and FIG. 3B shows a specific example of the administration information. The administration information includes a registration date/end date data indicating a registration date of registering the tourist information and an end date of ending the display of the tourist information, a category ID specifying the type of the tourist spot such as a tourist mecca, a restaurant and a hotel, a tourist spot name ID for display as identification information of the name of the tourist spot for display, and a file name of thumbnail images of picture images obtained by photographing the tourist spot.

The administration information also includes a tourist spot name ID for print as identification information of the name of the tourist spot for print and its coordinates; a file name of picture images of the tourist spot and its coordinates; a guide text ID as identification information of a guide text of the tourist spot and its coordinates; a file name of an image of a map in and around the tourist spot, its coordinates and area information consisting of latitude and longitude specifying an area range of the map; a destination designating message ID as identification information of a message for designating the tourist spot as a destination and its coordinates; a contact information ID as identification information of a character string specifying a contact information such as a telephone number and its coordinates; a file name of an images of a discount ticket for services provided at the tourist spot and its coordinates; a character string ID of the discount ticket as identification information of character strings indicating the content of discount included in the discount ticket and their coordinates; and plural print information indicating as to whether or not a plurality of prints are to be made and indicating information positions of data of the second and successive prints if two or more prints are designated for one tourist spot information (hereinafter, IDs relating to character strings are collectively referred to as "character string IDs").

Figure 4:
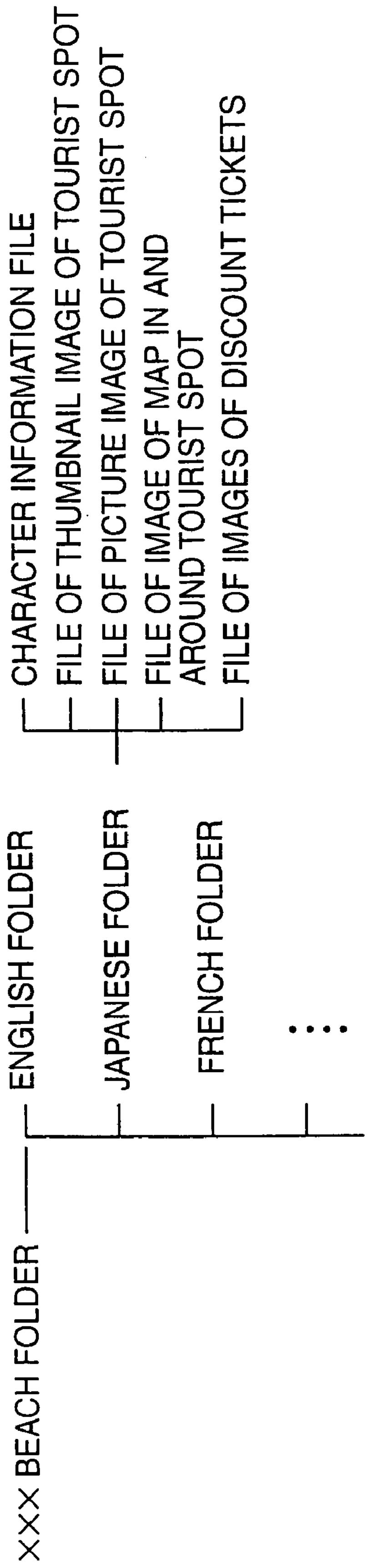
FIG. 4 is a data configuration diagram showing one example of tourist spot information saved in a tourist spot information storage.

FIG. 4 is a data configuration diagram showing one example of the tourist spot information saved in the tourist spot information storage 141. The tourist spot information storage 141 is adapted for storing a plurality of tourist spot information folder for each tourist spot. Each tourist spot information folder includes a plurality of language folders for the respective languages, and each language folder includes a character information file, a file of a thumbnail image of the tourist spot, a file of a picture image of the tourist spot, a file of an image of a map in and around the tourist spot, and a file of an image of a discount ticket. The character information file includes character strings in language corresponding to this language file and indicating the name of the tourist spot for display, the name of the tourist spot for print, a guide text, a destination designating message, contact information and the content of discount of the discount ticket. The file of the thumbnail image of the tourist spot, the file of the picture image of the tourist spot, the file of the image of the map in and around the tourist spot and the file of the image of the discount ticket include the thumbnail image of the tourist spot, the picture image of the tourist spot, the image of the map in and around the tourist spot containing the names of places represented by character strings in the language corresponding to this language file and a mark specifying the position of the tourist spot, and the image of the discount ticket.

FIGS. 5A and 5B are data configuration diagrams showing examples of the character information file included in a tourist spot information folder of a certain tourist spot, for example, "XXX beach", wherein FIG. 5A shows a character information file included in an English folder and FIG. 5B shows a character information file included in a Japanese folder. Each character information file includes character string data of each language corresponding to a tourist spot name ID for display, a tourist spot name ID for print, a guide text ID, a destination designating message ID, a contact information ID, and a character string ID of a discount ticket.

Figure 6:
FIG. 6 is a data configuration diagram showing one example of a guide screen folder saved in an operation guide information storage.

FIG. 6 is a data configuration diagram showing a guide screen folder saved in the operation guide information storage 143. The guide screen folder is comprised of a plurality of guide screen folders A, B, . . . each including operation guide information on each guide screen of the tourist spot information. Each guide screen folder is comprised of a plurality of language files including character string data for operation guide in the respective languages and a related information file including related information such as the arrangement of the character strings for operation guide on the monitor 11.

The control unit 13 is provided with a reception processing section 130, a language receiving section 131, a category receiving section 133, a searching section 134, a display controlling section 135, a position information acquiring section 136, a flag setting section 137, a print controlling section 138, an image generating section 139, and a charge calculating section 140. The reception processing section 130 processes the reception of various instructions inputted via the operation screens of the monitor 11. The language receiving section 131 saves a selected local language in the first language storage 144*a* upon receiving the selection of the local language via the operation screen of the monitor 11. The language receiving section 131 saves selected display language information in the second language storage 144*b* upon receiving the selection of a display language via the operation screen of the monitor 11. The tourist spot receiving section 132 receives the selection of a tourist spot via the operation screen of the monitor 11.

The category receiving section 133 receives the selection of the category (type) of tourist spots to be searched, the selection being inputted via the operation screen of the monitor 11, and saves the selected category in the category storage 145 upon the category search of the tourist spot informations. The searching section 134 searches administration information having category IDs corresponding to this category information from those saved in the administration information storage 142 based on the category information saved in the category storage 145, and detects the names of the tourist spots and the thumbnail images of the tourist spots corresponding to this category based on the tourist spot name IDs for display and the file names of the thumbnail images of the tourist spots included in the administration information obtained as search results.

The display controlling section 135 causes the monitor 11 to display a list of the thumbnail images of a plurality of tourist spots together with the character strings of the names of the tourist spots written in the display language designated by the language receiving section 131, and causes the monitor 11 to display the picture image of the selected tourist spot together with the character strings of the name of the tourist spot and the guide text written in the display language designated by the language receiving section 131 when the selection of the tourist spot is received by the tourist spot receiving section 132. Further, the display controlling section 135 causes the monitor 11 to display a list of the search results by the searching section 134, i.e. a list of the thumbnail images of the tourist spots corresponding to the selected category and the character strings of the names of the tourist spots written in the display language when the category search of the tourist spot informations is conducted. The display controlling section 135 also causes the monitor 11 to display the character string data for operation guide in the display language designated by the language receiving section 131.

The position information acquiring section 136 measures a present location, utilizing a GPS (global positioning system) function, and saves position information consisting of the latitude and longitude information of the present position in the position information storage 147. It should be noted that position information inputting means such as the display of an input screen enabling the input of present position information may be provided in place of the position information acquiring section 136.

The flag setting section 137 sets a print execution flag in the administration information of the tourist spot information instructed to be printed if a print instruction is given for the tourist spot information displayed on the monitor 11.

The print controlling section 138 includes the image generating section 139 for generating a print data from the tourist spot information saved in the tourist spot information storage 141, and outputs the print data generated by the image generating section 139 together with the print instruction to the printer 23.

The image generating section 139 searches the administration informations in which the print execution flag is set from the administration informations saved in the administration information storage 142, and generates a print data from the tourist spot informations corresponding to this administration informations. Specifically, the image generating section 139 searches the display language folder and the local language folder from the tourist spot information folder of the tourist spot instructed to be printed; extracts the image data of the picture image of the tourist spot and the image data of the discount ticket from the picture image file of the tourist spot and the image file of the discount ticket included in the display language folder; and extracts the character string data of the tourist spot name, the guide text, the destination designating message, the contact information and the content of discount from the character information file included in this display language folder.

Further, the image generating section 139 extracts the image data of the map in and around the tourist spot from the image file of the map in and around the tourist spot included in the local language folder, and generates the print data in accordance with the respective image data and the coordinates of the character data after extracting the character string data of the tourist spot name, the destination designating message, the contact information and the content of discount from the character information file included in this local language folder. At this time, there is generated the print data in which the character string data of the name of the tourist spot, the destination designating message, the contact information and the content of discount written in the display language are arranged together with the character string data of the name of the tourist spot, the destination designating message, the contact information and the content of discount written in the local language.

The image generating section 139 also generates a print data in which a symbol for specifying the present location on the map in and around the tourist spot, for example, a circular mark is included in the image data of the map in and around the tourist spot if the position indicated by the position information of the present location is included in the area range of the map in and around the tourist spot specified by the area information.

A charge receiving section 24 calculates an amount of money inserted through slots 21. The charge calculating section 140 calculates a charge amount using a total number of prints to be made for the respective tourist spots received by the reception processing section 130 and the print unit price saved in the charge information storage 146, and saves the calculated charge amount information in the charge storage 146. The charge calculating section 140 also permits the print controlling section 138 to carry out a printing operation when the charge amount calculated by the charge calculating section 140 is calculated by the charge receiving section 24.

Figure 7:
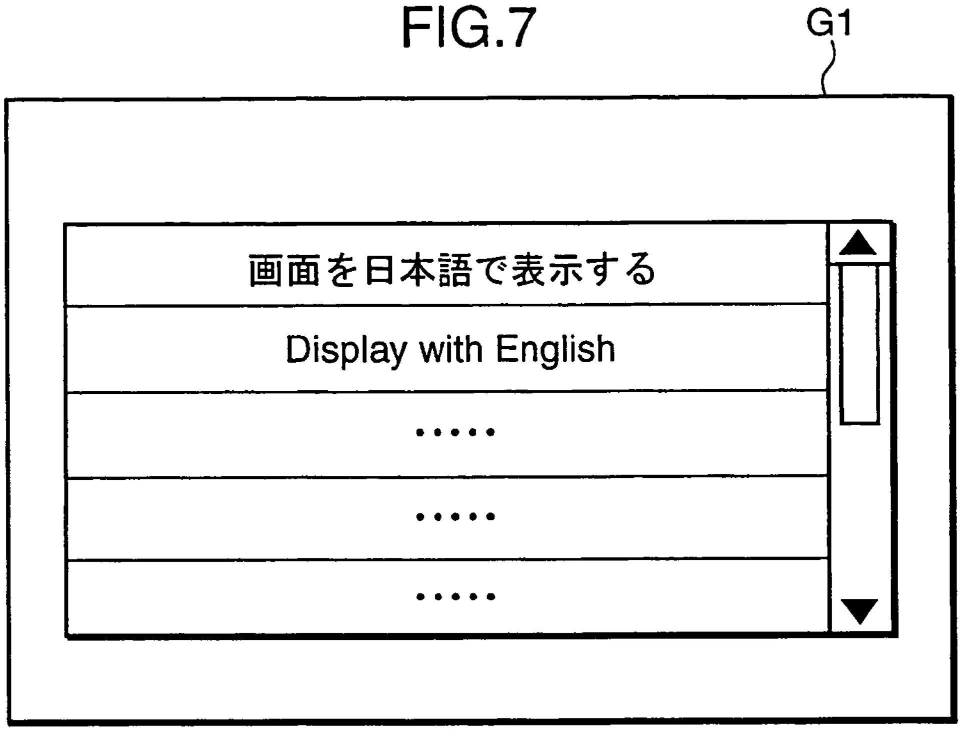
FIG. 7 is a diagram showing one example of a language selecting screen to be displayed on a monitor.

Next, the guide screens to be displayed on the monitor 11 are described with reference to FIGS. 7 to 12. FIG. 7 is a diagram showing one example of a language selecting screen used to select the display language of the monitor 11. Messages "Screen is displayed in XXX language" are displayed, for example, in the respective languages on a language selecting screen G1, and the display language on the operation screens is selected by selecting a display area of any one of the messages. When the display language is selected, the display language information selected by the language receiving section 131 is saved in the second language storage 144*b*. From then on, the character strings for operation guide and character strings of the tourist spot information are displayed in the selected display language on the monitor 11.

If the local language is selected on an environment setting screen (not shown) displayed on the monitor 11 at the time of installing this picture processing apparatus, the same screen as the language selecting screen G1 is displayed on the monitor 11. When the local language is selected on the screen, the local language information selected by the language receiving section 131 is saved in the first language storage 144*a*.

Figure 8:
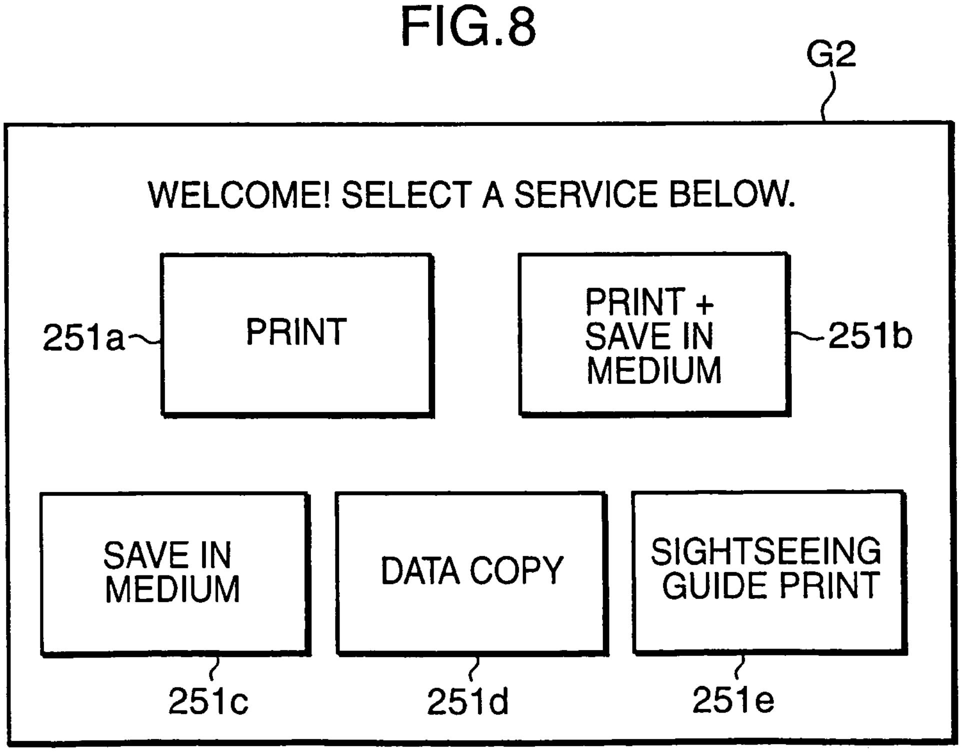
FIG. 8 is a diagram showing one example of a processing selecting screen to be displayed on the monitor.

FIG. 8 is a diagram showing one example of a processing selecting screen G2 to be displayed on the monitor 11 upon selecting the display language. Selection keys 251*a* to 251*e* for selecting any one of services such as an operation of printing the image data, an operation of storing the image data in a CD, an operation of preparing a sightseeing guide print are displayed on the processing selecting screen G2. Here, the character strings for operation guide are displayed in the display language selected on the language selecting screen G1, for example, in Japanese.

Figure 9:
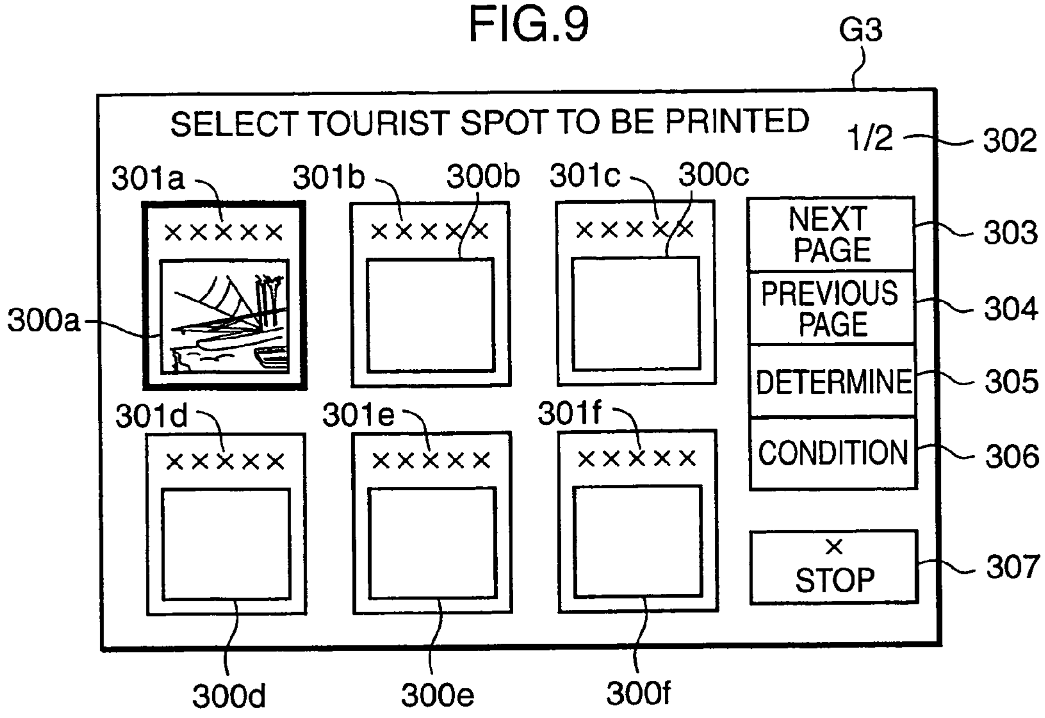
FIG. 9 is a diagram showing one example of a tourist spot listing screen to be displayed on the monitor.

FIG. 9 is a diagram showing a tourist spot listing screen to be displayed on the monitor 11 when the selection key 251*e* is selected to prepare the sightseeing guide print on the processing selecting screen G2. Thumbnail images 300*a* to 300*f* of a plurality of tourist spots are displayed in a specified part of the screen, e.g. in a middle part of the screen, and character strings 301*a* to 301*f* of the names of the tourist spots written in the designated display language are displayed together with the respective images 300*a* to 300*f*. When a display area including the thumbnail image of the tourist spot and the name of the tourist spot is selected, the selected tourist spot is received by the tourist spot receiving section 132. In another part of the screen, for example, in the right side of the screen, present/total page numbers 302, a next page key 303 used to display a tourist spot listing screen on the next page on the monitor 11, a previous page key 304 used to display a tourist spot listing screen on the previous page on the monitor 11, a determine key 305 used to input a start instruction for starting the printing operation of the tourist spot information instructed to be printed, a condition key 306 used to transit to a condition setting screen G5 for setting a search condition when searching the tourist spot informations having a specified condition from a plurality of tourist spot informations, and a stop key 307 used to cancel a series of operations and return the display screen of the monitor 11 to the language selecting screen G1.

Figure 10:
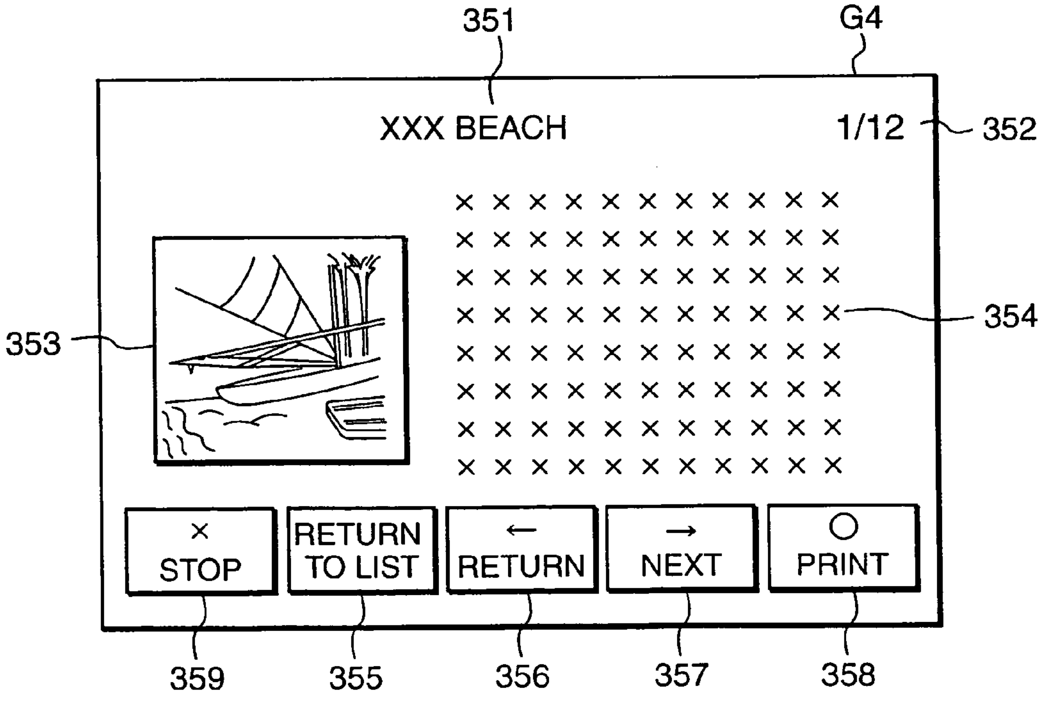
FIG. 10 is a diagram showing one example of a tourist spot guiding screen to be displayed on the monitor.

FIG. 10 is a diagram showing a tourist spot guiding screen G4 to be displayed on the monitor 11 when the tourist spot is selected on the tourist spot listing screen G3. A tourist spot name 351 is displayed in a specified part of the screen, for example, in an upper middle part of the screen, and present/total page numbers 352 are displayed at the upper left side of the screen. Further, a picture image 353 of the tourist spot and a guide text 354 of the tourist spot written in the designated display language are displayed in a middle part of the screen. Furthermore, a listing screen display key 355 used to return the display screen of the monitor 11 to the tourist spot listing screen G3, a return key 356 used to display the tourist spot information on the previous page on the monitor 11, a next key 357 used to display the tourist spot information on the next page on the monitor 11, a print key 358 used to input a print instruction to print the tourist spot information displayed on the monitor 11, and a stop key 359 used to return the display screen of the monitor 11 to the language selecting screen G1.

When the print key 358 is selected on the tourist spot guiding screen G4, the print execution flag is set in the administration information of the selected tourist spot by the flag setting section 137, the display screen of the monitor 11 is switched to the tourist spot listing screen G3, and the display area of the thumbnail image of the tourist spot instructed to be printed has its display mode changed, for example, has the outer frame thereof changed to a solid-line one in order to show to have been selected.

Figure 11:
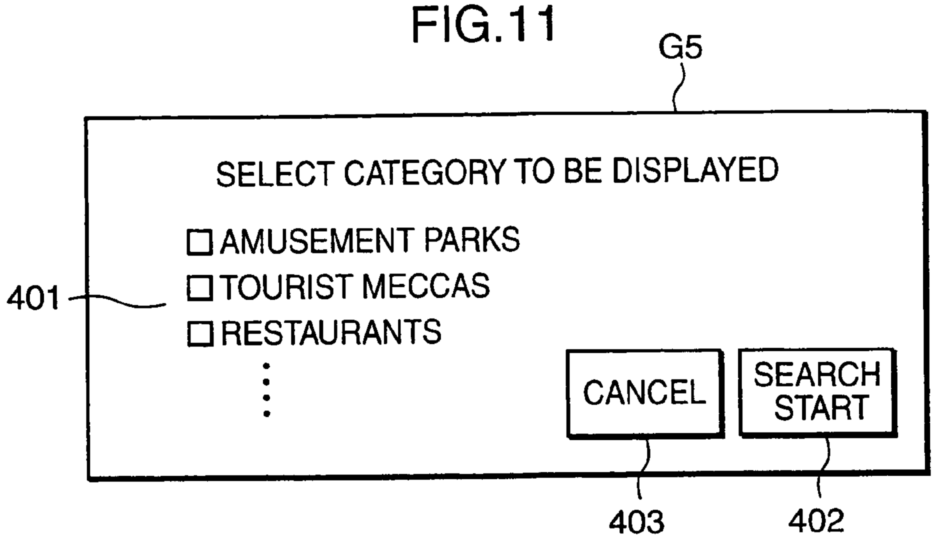
FIG. 11 is a diagram showing one example of a condition setting screen to be displayed on the monitor.

FIG. 11 is a diagram showing one example of the condition setting screen G5 to be displayed on the monitor 11 when the condition key 306 is selected on the tourist spot listing screen G3. A plurality of check boxes 401 are displayed on the condition setting screen G5 to select the type of the tourist spots such as an amusement part, a tourist mecca, and a restaurant. When the type of the tourist spot is selected, a symbol indicating the selection, for example, a circular mark is displayed in the corresponding check box 401. Simultaneously, the selected category information is received by the reception processing section 130 and saved in the category storage 145.

A search start key 402 used to input a start instruction to start the category search of tourist spots and a cancel key 403 used to cancel the selection of the type of tourist spots are also displayed on the condition setting screen G5. When the search start key 402 is pressed down with the type of tourist spots selected, the administration informations having the category IDs corresponding to the selected category information are searched by the searching section 134 from the administration informations saved in the administration information storage 142, the thumbnail images of the tourist spots and the character strings of the names of the tourist spots are extracted from the files of the designated display language using the file names of the thumbnail images of the tourist spots and the tourist spot name IDs for display included in the administration informations as keys, and the tourist spot listing screen including the thumbnail images and the names of the tourist spots corresponding to this category are displayed on the monitor 11.

Figure 12:
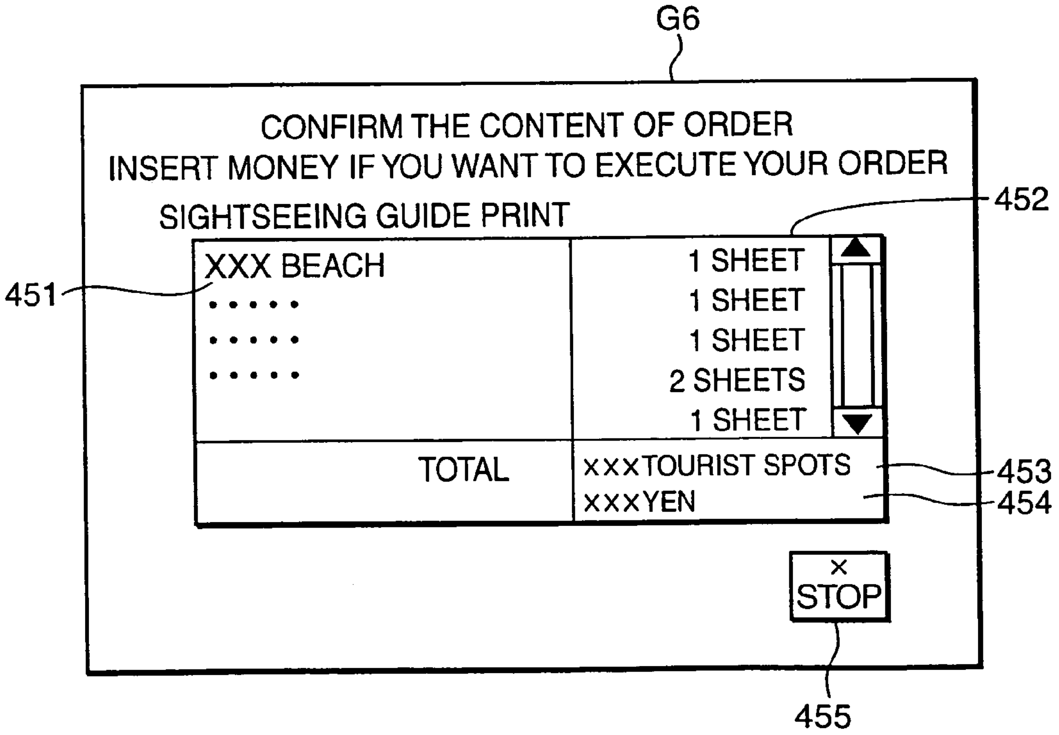
FIG. 12 is a diagram showing one example of a charge calculating screen to be displayed on the monitor.

FIG. 12 is a diagram showing a charge calculating screen to be displayed on the monitor 11 when the determine key 305 is selected on the tourist spot listing screen G3. Names 451 of the tourist spots instructed to be printed, numbers 452 of prints of the respective tourist spots to be made, a number 453 of the tourist spots instructed to be printed, a charge 454 calculated from a total number of prints to be made and the print unit price, and a stop key 455 used to cancel the inputted order and return the display screen of the monitor 11 to the language selecting screen G1 are displayed on the charge calculating screen G6.

Figure 14:
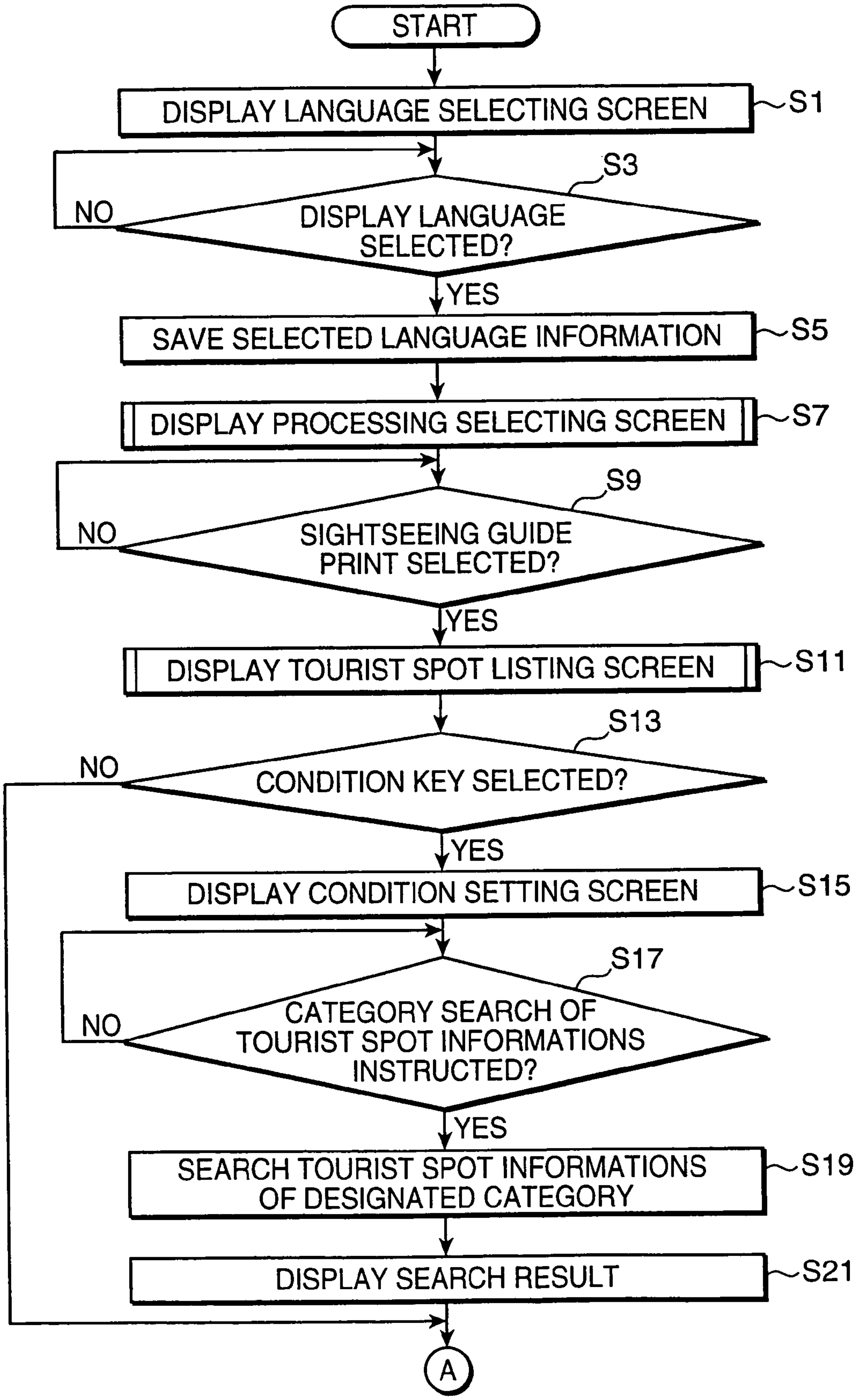
FIGS. 14 and 15 are a flow chart showing the processing of a control unit when an operation to order a sightseeing guide print is received by a receiving unit.
Figure 15:
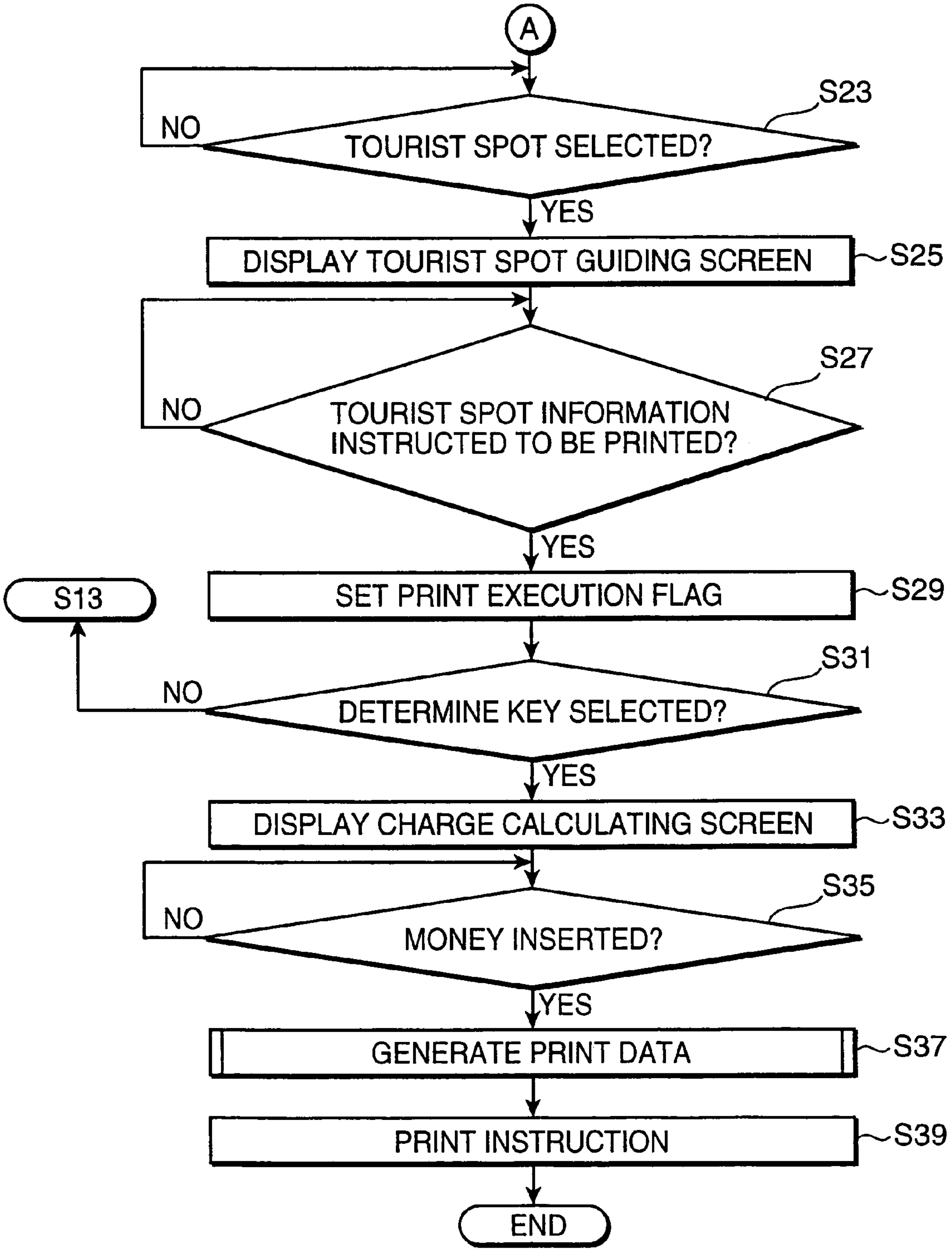

FIGS. 14 and 15 are a flow chart showing the processing of the control unit 13 when an operation of ordering sightseeing guide prints is received by the receiving unit 1. First, the language selecting screen G1 is displayed on the monitor 11 (Step S1). Whether or not the display language has been selected is judged by the reception processing section 130 (Step S3). If the display language has been selected, the language information selected by the reception receiving section 130 is saved in the second language storage 144*b* (Step S5).

Subsequently, the processing selecting screen G2 is displayed on the monitor 11 (Step S7). Whether or not the sightseeing guide print service has been selected on the processing selecting screen G2 is judged by the reception processing section 130 (Step S9). If the sightseeing guide print service has been selected, the tourist spot listing screen G3 is displayed on the monitor 11 (Step S11). Whether or not the condition key 306 has been selected on the tourist spot listing screen G3 is further judged by the reception processing section 130 (Step S13). If the condition key 306 has been selected, the condition setting screen G5 is displayed on the monitor 11 (Step S15). Whether or not the search start instruction to start the search of the tourist spot information has been inputted on the condition setting screen G5 is judged by the reception processing section 130 (Step S17). If the search start instruction has been inputted, the administration information having the designated category ID are searched by the searching section 134 from the administration information saved in the administration information storage 142 (Step S19), and the thumbnail images and the names of the tourist spots corresponding to the selected category are displayed in the form of a list on the monitor 11 (Step S21).

Whether or not the tourist spot has been selected on the tourist spot listing screen G3 is judged by the tourist spot receiving section 132 (Step S23). If the tourist spot has been selected, the tourist spot guiding screen G4 is displayed on the monitor 11 (Step S25). Whether or not a print instruction for the tourist spot information has been inputted by selecting the print key 358 on the tourist spot guiding screen G4 is judged by the reception processing section 130 (Step S27). Upon the input of the print instruction for the tourist spot information, the print execution flag is set in the administration information of the tourist spot information by the flag setting section 137 (Step S29).

Whether or not a print execution instruction for the tourist spot information has been inputted by selecting the determine key 305 on the tourist spot listing screen G3 is further judged by the reception processing section 130 (Step S31). Until the print execution instruction is inputted, the tourist spot information are searched according to another category information and another print instruction is given for the tourist spot information in Step S13 to S29. This routine proceeds to Step S33 upon the input of the print execution instruction.

In Step S33, the charge amount is calculated from the number of prints to be made for the respective tourist spots instructed to be printed and the print unit price by the charge calculating section 140, and the charge calculating screen G6 is displayed on the monitor 11. Whether or not the amount calculated by the charge receiving section 24 has reached the charge amount is judged by the charge calculating section 140 (Step S35), and a permission signal for permitting the printing operation is outputted to the printing controlling section 138 by the charge calculating section 140 when the amount calculated by the charge receiving section 24 reaches the charge amount. Upon receiving this permission signal, the print data of the tourist spot information instructed to be printed are generated by the printing controlling section 138 (Step S37), and an instruction is given to the printer 23 to print the generated print data (Step S39).

Figure 16:
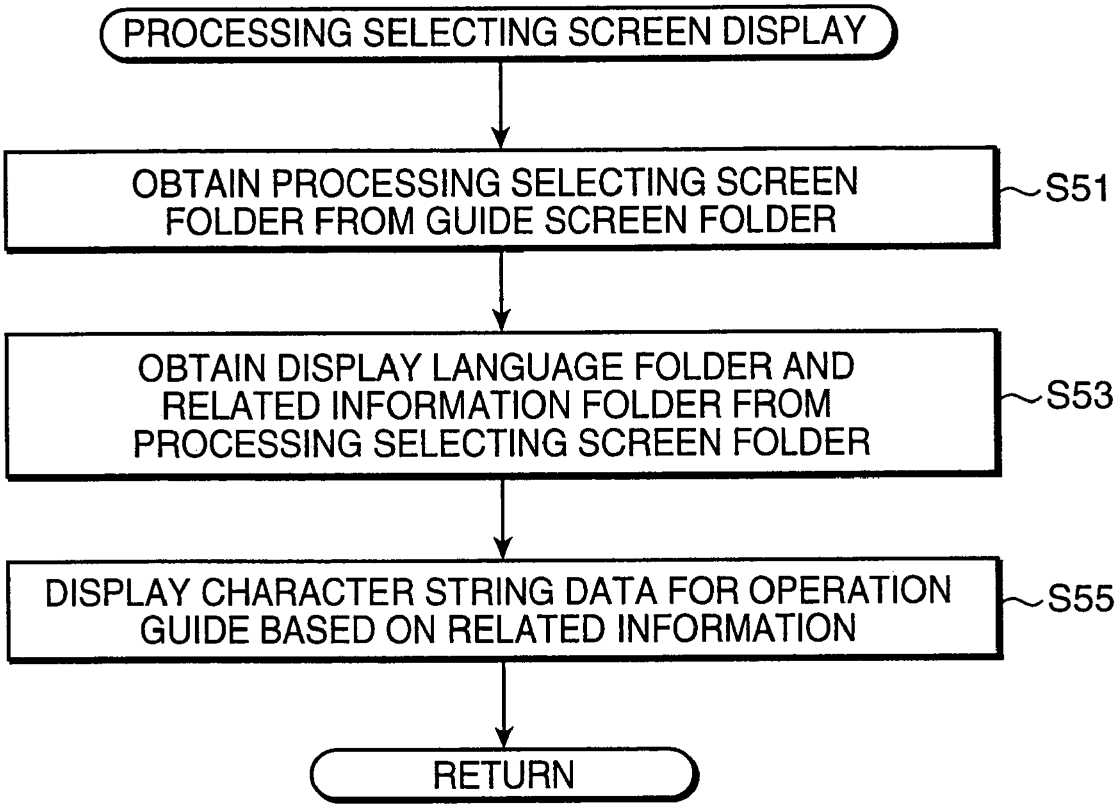
FIG. 16 is a flow chart showing the processing of a display controlling section upon displaying the processing selecting screen on the monitor.

FIG. 16 is a flow chart showing the processing of the display controlling section 135 upon displaying the processing selecting screen G2 on the monitor 11. First, a processing selecting screen folder is obtained from the guide screen folder (Step S51), and the display language file and the related information file are extracted from the processing selecting screen folder (Step S53). Subsequently, the character string data for operation guide included in the display language file are displayed in specified arrangement and size on the monitor 11 based on the related information included in the related information file (Step S55).

Figure 17:
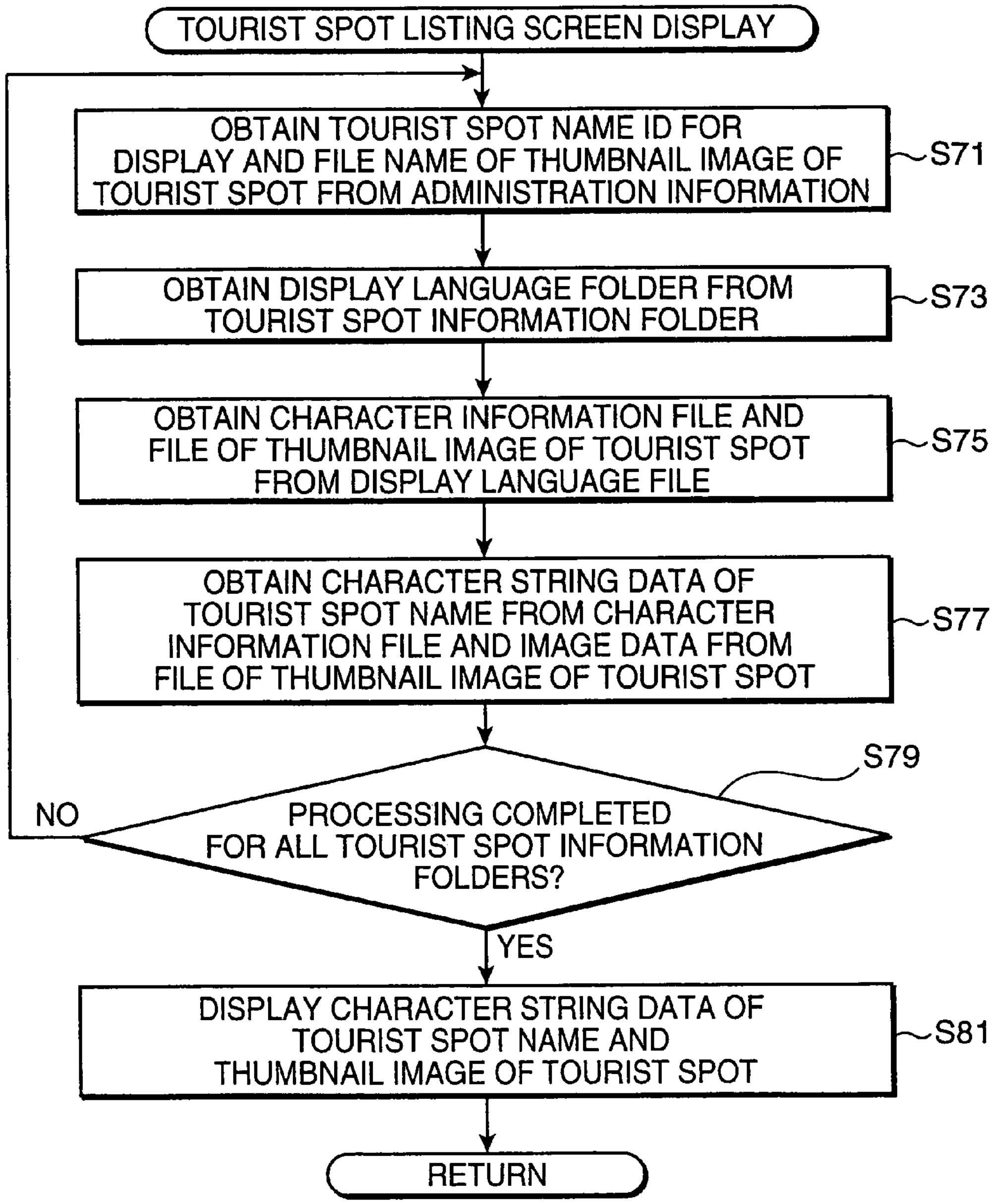
FIG. 17 is a flow chart showing the processing of the display controlling section upon displaying the tourist spot listing screen on the monitor.

FIG. 17 is a flow chart showing the processing of the display controlling section 135 upon displaying the tourist spot listing screen G3 on the monitor 11. First, the tourist spot name for display and the file name of the thumbnail image of the tourist spot are obtained from the administration information (Step S71). Subsequently, the display language folder is extracted from the tourist spot information folder (Step S73), the character information file and the file of the thumbnail image of the tourist spot are obtained from this folder (Step S75), and the character string data of the tourist spot name is obtained from the character information file using the tourist spot name ID for display as a key and the image data of the thumbnail image of the tourist spot is obtained from the file of the thumbnail image of the tourist spot (Step S77). Then, it is judged whether or not the character string data of the tourist spot name and the image data of the thumbnail image of the tourist spot have been obtained for all the tourist spot information folders (Step S79). This routine returns to Step S71 unless the data obtainment has been completed, whereas the character strings and the thumbnail images of the obtained tourist spot names are displayed in the form of a list on the monitor 11 (Step S81) if the data obtainment has been completed.

Figure 18:
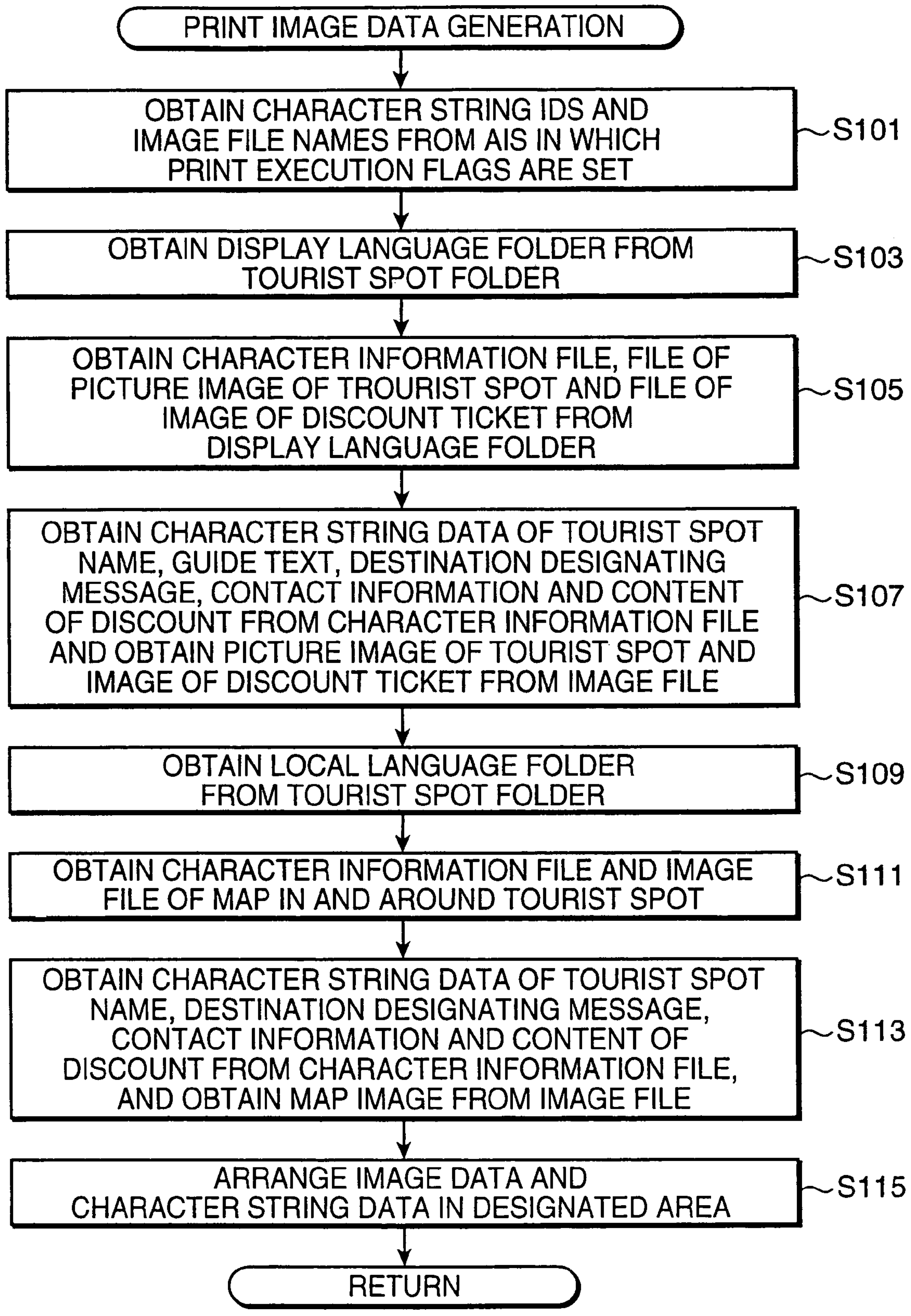
FIG. 18 is a flow chart showing a print data generating operation by an image generating section.

FIG. 18 is a flow chart showing the processing of generating the print data by the image generating section 139. First, the character string IDs (tourist spot name IDs for print, guide text IDs, destination designating message IDs, contact information IDs and character string IDS of discount tickets) and the image file names (file names of the picture images of the tourist spots, file names of the images of the maps in and around the tourist spots and file names of the images of the discount tickets) are obtained from the administration informations in which the print execution flags are set (Step S101).

Subsequently, the display language folders are extracted from the tourist spot information folders corresponding to the administration information (Step S103), and the character information files, the files of the picture images of the tourist spots and the files of the images of the discount tickets are obtained from these extracted folders (Step S105). The character string data of the tourist spot names for print, the guide texts, the destination designating messages, the contact informations and the contents of discounts are obtained from the character information files using the character string IDs as keys, and the picture images of the tourist spots and the image data of the discount tickets are obtained from the respective image files (Step S107).

Subsequently, the designated local language folders are extracted from the tourist spot information folders related to the administration information (Step S109), and the character information files and the files of the images of the maps in and around the tourist spots are obtained from these folders (Step S111). The tourist spot names for print, the destination designating messages, the contact informations and the character string data of the contents of discounts are obtained from the character information files using the character string IDs as keys, and the image data of the maps in and around the tourist spots are obtained from the obtained image files (Step S113). After the obtained image data and character string data are enlarged or reduced in size according to the sizes of areas specified by the respective coordinates, a print data is generated in which the image data and the character string data are arranged in the areas specified by the respective coordinates (Step S115).

Figure 13:
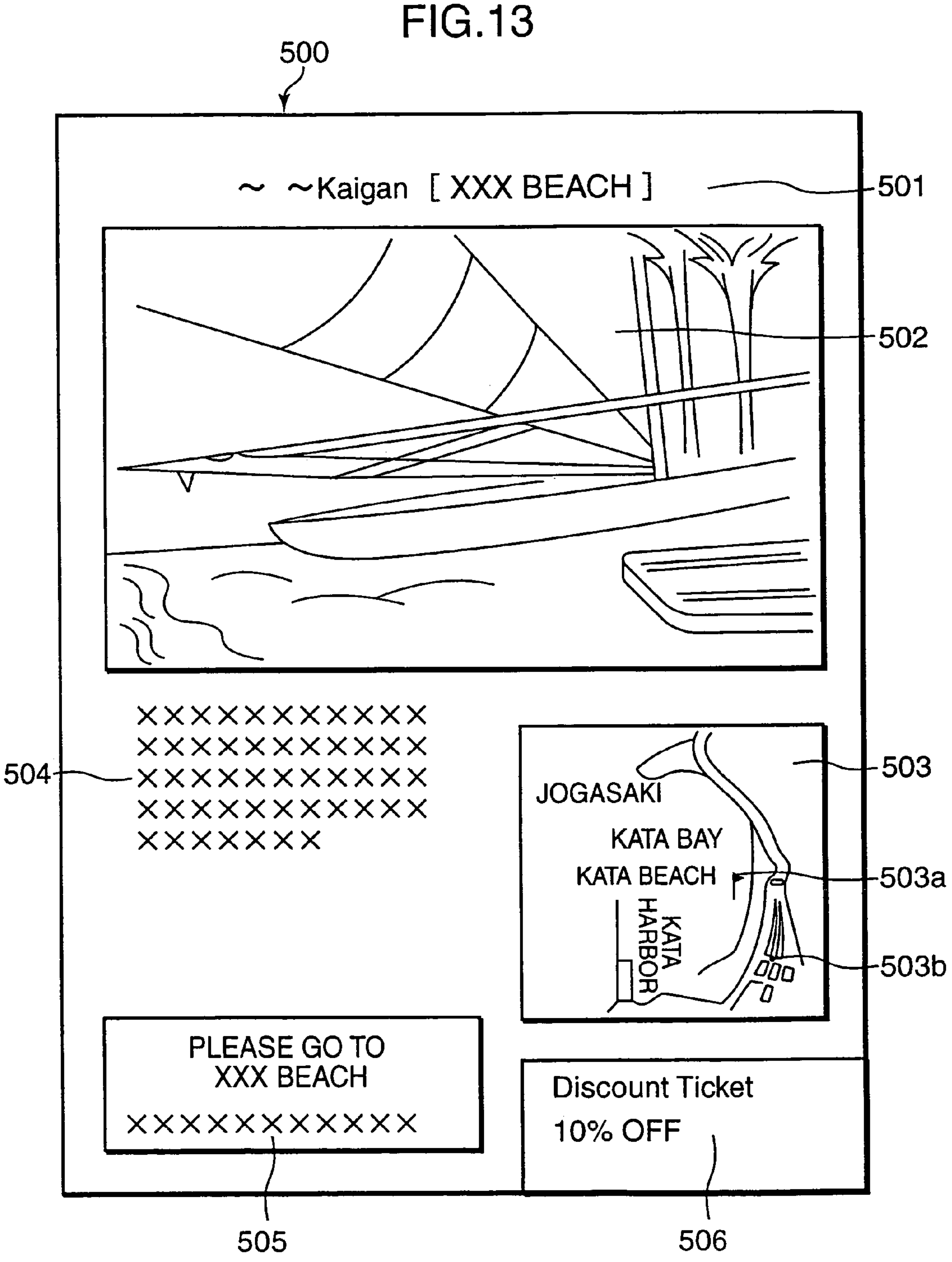
FIG. 13 is a diagram showing one example of a sightseeing guide print printed by a printer.

FIG. 13 shows one example of the sightseeing guide print outputted by the printer 23. On a sightseeing guide print 500, a picture image 502 of a tourist spot and an image 503 of the map in and around the tourist spot are printed; a tourist spot name 501 is printed in a local language and a display language designated by a user; a guide text 504 of the tourist spot is printed in the display language designated by the user; characters included in the map image 503 are printed in the local language; a destination designating message 505 is printed in the local language and the display language designated by the user; and a character string 506 representing the content of discount is printed in the local language and the display language designated by the user. Accordingly, the tourist spot information can be understood not only by foreign travelers, but also by local people, so that even an traveler unaccustomed to the local language can easily tell his destination to local people, for example, a taxi driver by presenting the destination designating message 505 and the map 503 of the sightseeing guide print 500 and can arrive at the destination. Since the map 503 in and around the tourist spot includes position information 503*a* of the destination and position information 503*b* of a present position, the destination can be easily reached.

According to this embodiment, since the character strings for sightseeing guide are written in the display language, for example, the native language of the traveler, the tourist spot information can be easily understood and the tourist spot information guide service can be utilized regardless of the native language of the traveler. Further, since the tourist spot information can be searched according to category, tourist spot information conforming to the purpose of the traveler can be obtained.

Further, since the tourist spot information of a desired tourist spot can be printed, a sightseeing guide print easy to carry around can be obtained on his journey even if the traveler does not have a guidebook written in native language with him. Furthermore, since only the tourist spot information necessary for the traveler is printed, it needs not to be discarded unlike guidebooks or sightseeing guide brochures when information is changed, whereby a waste of paper can be reduced.

Although the image generating section 139 attaches the mark specifying the present position to the map image in and around the tourist spot instructed to be printed in the foregoing embodiment, the present invention is not limited thereto. For example, a tourist spot information storage storing a wide-area map image of an area where this apparatus is installed and storing the position information of the respective tourist spots may be provided, and the image generating section 139 may attach marks specifying the position of the selected tourist spot and the present position to the wide-area map image upon generating the sightseeing guide print data of the tourist spot instructed to be printed.

As described above, a novel tourist information guiding apparatus comprises: a tourist spot information storage device for storing image data relating to tourist spots in correspondence with character string data for sightseeing guide written in a plurality of languages; a monitor provided on an apparatus main body; a tourist spot receiver provided in the apparatus main body for receiving the selection of a tourist spot; a language receiver provided in the apparatus main body for receiving the selection of a language; and a display controller for causing the monitor to display an image relating to the tourist spot selected by the tourist spot receiver together with a character string for sightseeing guide written in the language designated by the language receiver.

With this construction, since the image relating to the tourist spot selected by the tourist spot receiver is displayed on the monitor together with the character string for sightseeing guide written in the language designated by the language receiver, the tourist information can be easily understood, for example, by displaying the character string for sightseeing guide in a traveler's native language. Accordingly, the tourist information guiding service can be effectively utilized regardless of the traveler's native language. Further, since the tourist spot information is stored as data, the tourist information can be easily updated.

Preferably, the display controller may cause the monitor to display, for a plurality of tourist spots, a list of images relating to the respective tourist spots together with character strings for sightseeing guide written in the language designated by the language receiver.

With this construction, the tourist information for a plurality of tourist spots can be efficiently browsed since, for a plurality of tourist spots, the images relating to the tourist spots and the character strings for sightseeing guide written in the language designated by the language receiver are displayed in the form of a list on the monitor.

Preferably, the tourist information guiding apparatus may be further provided with a type information storage device for storing type information specifying the types of the tourist spots in correspondence with the image data relating to the tourist spots; a type receiver provided in the apparatus main body for receiving the selection of the type of the tourist spots; and a searcher for searching the image data of the tourist spots corresponding to the tourist spot type selected by the type receiver from contents of storage of the tourist spot information storage device. The display controller may cause the monitor to display a list of images relating to the tourist spots searched by the searcher together with the character strings for sightseeing guide written in the language designated by the language receiver.

With this construction, when the selection of the type of the tourist spots is received by the type receiver, the image data relating to the tourist spots corresponding to the selected tourist spot type are searched by the searcher from the contents of storage of the storage device, and the images relating to the tourist spots searched by the searcher and the character strings for sightseeing guide written in the language designated by the language receiver are displayed in the form of a list on the monitor. Thus, the tourist information conforming to the traveler's purpose can be obtained.

Preferably, the tourist information guiding apparatus may be further provided with a printer for printing an image on a recording sheet; a print instruction receiver provided in the apparatus main body for receiving a print instruction from the outside to print the image relating to the tourist spot displayed on the monitor and the character string for sightseeing guide written in the image, and a print controller for causing the printer to print the image relating to the tourist spot instructed to be printed and the character string for sightseeing guide written in the image.

With this construction, since the image relating to the tourist spot instructed to be printed and the character string for sightseeing guide written together with this image are printed by the printer, a sightseeing guide print on which the tourist spot is written in the traveler's native language can be obtained at his travel destination. Thus, even if he/she does not have any guidebook with him/her, the sightseeing guide print easy to carry around can be obtained on his/her journey, thereby realizing a comfortable journey with less baggage.

Further, since only the tourist information necessary for the traveler is printed, it is not necessary to discard unlike guidebooks and sightseeing guide brochures when the information is updated, thereby reducing a waste of paper.

Preferably, the tourist information guiding apparatus may be further provided with a local language receiver in the apparatus main body for receiving the selection of a local language used at the place of installation of the apparatus from a plurality of languages. The print controller may cause the character string data for sightseeing guide in the language designated by the language receiver and in the local language designated by the local language receiver to be included in a print data.

With this construction, not only the traveler, but also local people can easily understand the tourist information since the character string data for sightseeing guide is printed in the language designated by the language receiver and in the local language designated by the local language receiver.

Preferably, the tourist spot information storage device may store a character string data of a message for designating the tourist spot as a destination for each tourist spot. The print controller may cause the character string data of the message to be included in the print data.

With this construction, the destination can be informed to a taxi driver or other local people by presenting the sightseeing guide print since the character string data of the message for specifying the tourist spot instructed to be printed as the destination is printed.

Preferably, the tourist spot information storage device may store a character string data representing the content of discount of a service discount ticket handed out at the tourist spot for each tourist spot. The print controller may cause the character string data representing the content of discount of the discount ticket and/or the image data to be included in the print data.

With this construction, the service discount ticket and the like can be utilized by presenting the sightseeing guide print to an employee or other people at the tourist spot since the character string data representing the content of discount of the service discount ticket handed out at the tourist spot and/or the image data are printed.

Preferably, the tourist spot information storage device may store an image data of a map in and around the tourist spot for each tourist spot. The print controller may cause the image data of the map to be included in the print data.

With this construction, access to the destination becomes easier since the image data of the map in and around the tourist spot is printed.

Preferably, the tourist information guiding apparatus may be further provided with a position information acquirer for acquiring position information of the place of installation of the apparatus. The print controller may cause the image data of the map including the position information of the place of installation of the apparatus to be included in the print data.

With this construction, direction to the destination and the like can be confirmed since the position information of the place of installation of this apparatus is acquired by the position information acquirer, and the image data of the map in and around the tourist spot including the position information of the place of installation of the apparatus is printed. Therefore, access to the destination becomes even easier is application is based on patent application No. 2004-254583 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A tourist information guiding apparatus, comprising:

a tourist spot information storage device configured to store image data relating to tourist spots in correspondence with character string data for a sightseeing guide written in a plurality of languages;

a monitor provided on an apparatus main body;

a tourist spot receiver provided in the apparatus main body configured to receive a selection of a tourist spot;

a language receiver provided in the apparatus main body configured to receive a selection of a language;

a display controller configured to cause the monitor to display an image relating to the tourist spot selected by the tourist spot receiver together with a character string for sightseeing guide written in the language designated by the language receiver;

a printer configured to print an image on a recording sheet;

a print instruction receiver provided in the apparatus main body configured to receive a print instruction from the outside to print the image relating to the tourist spot displayed on the monitor and the character string for the sightseeing guide written in the image;

a print controller configured to cause the printer to print the image relating to the tourist spot instructed to be printed and the character string for the sightseeing guide written in the image; and a local language receiver provided in the apparatus main body configured to receive the selection of a local language used at the place of installation of the apparatus from a plurality of languages; and said print controller causes the character string data for the sightseeing guide stored in said tourist spot information storage device in the language designated by the language receiver and in the local language designated by the local language receiver to be included in a print data.

2. A tourist information guiding apparatus according to claim 1, wherein the display controller causes the monitor to display, for a plurality of tourist spots, a list of images relating to the respective tourist spots together with character strings for sightseeing guide written in the language designated by the language receiver.

3. A tourist information guiding apparatus according to claim 2, further comprising: a printer for printing an image on a recording sheet;

a print instruction receiver provided in the apparatus main body for receiving a print instruction from the outside to print the image relating to the tourist spot displayed on the monitor and the character string for sightseeing guide written in the image; and a print controller for causing the printer to print the image relating to the tourist spot instructed to be printed and the character string for sightseeing guide written in the image.

4. A tourist information guiding apparatus according to claim 2, further comprising: a type information storage device for storing type information specifying the types of the tourist spots in correspondence with the image data relating to the tourist spots;

a type receiver provided in the apparatus main body for receiving the selection of the type of the tourist spots; and a searcher for searching the image data of the tourist spots corresponding to the tourist spot type selected by the type receiver from contents of storage of the tourist spot information storage device;

wherein the display controller causes the monitor to display a list of images relating to the tourist spots searched by the searcher together with the character strings for sightseeing guide written in the language designated by the language receiver.

5. A tourist information guiding apparatus according to claim 4, wherein the tourist spot information storage device stores an image data of a map in and around the tourist spot for each tourist spot, and the print controller causes the image data of the map to be included in the print data.

6. A tourist information guiding apparatus according to claim 4, wherein the tourist spot information storage device stores an image data of a map in and around the tourist spot for each tourist spot, and the print controller causes the image data of the map to be included in the print data.

7. A tourist information guiding apparatus according to claim 4, wherein the tourist spot information storage device stores a character string data of a message for designating the tourist spot as a destination for each tourist spot, and the print controller causes the character string data of the message to be included in the print data.

8. A tourist information guiding apparatus according to claim 7, wherein the tourist spot information storage device stores an image data of a map in and around the tourist spot for each tourist spot, and the print controller causes the image data of the map to be included in the print data.

9. A tourist information guiding apparatus according to claim 4, wherein the tourist spot information storage device stores a character string data representing the content of discount of a service discount ticket handed out at the tourist spot for each tourist spot, and the print controller causes the character string data representing the content of discount of the discount ticket and/or the image data to be included in the print data.

10. A tourist information guiding apparatus according to claim 9, wherein the tourist spot information storage device stores an image data of a map in and around the tourist spot for each tourist spot, and the print controller causes the image data of the map to be included in the print data.

11. A tourist information guiding apparatus according to claim 10, further comprising a position information acquirer for acquiring position information of the place of installation of the apparatus, wherein the print controller causes the image data of the map including the position information of the place of installation of the apparatus to be included in the print data.

12. A tourist information guiding apparatus according to claim 1, further comprising: a type information storage device for storing type information specifying the types of the tourist spots in correspondence with the image data relating to the tourist spots;

a type receiver provided in the apparatus main body for receiving the selection of the type of the tourist spots; and a searcher for searching the image data of the tourist spots corresponding to the tourist spot type selected by the type receiver from contents of storage of the tourist spot information storage device;

wherein the display controller causes the monitor to display a list of images relating to the tourist spots searched by the searcher together with the character strings for sightseeing guide written in the language designated by the language receiver.

13. A tourist information guiding apparatus according to claim 1, further comprising: a printer for printing an image on a recording sheet;

a print instruction receiver provided in the apparatus main body for receiving a print instruction from the outside to print the image relating to the tourist spot displayed on the monitor and the character string for sightseeing guide written in the image; and a print controller for causing the printer to print the image relating to the tourist spot instructed to be printed and the character string for sightseeing guide written in the image.

14. A tourist information guiding apparatus, comprising:

a tourist spot information storage device configured to store image data relating to tourist spots in correspondence with character string data for a sightseeing guide written in a plurality of languages, said tourist spots information relating to information of a place where said tourist information guiding apparatus is installed; one of said plurality of languages being a local language used at the place of installation of said tourist information guiding apparatus;

a monitor provided on an apparatus main body;

a tourist spot receiver provided in the apparatus main body configured to receive a selection of a tourist spot;

a language receiver provided in the apparatus main body configured to receive a selection of a language;

a display controller configured to cause the monitor to display an image relating to the tourist spot selected by the tourist spot receiver together with a character string for sightseeing guide written in the language designated by the language receiver;

a printer configured to print an image on a recording sheet;

a print instruction receiver provided in the apparatus main body configured to receive a print instruction from the outside to print the image relating to the tourist spot displayed on the monitor and the character string for the sightseeing guide written in the image;

a print controller configured to cause the printer to print the image relating to the tourist spot instructed to be printed and the character string for the sightseeing guide written in the image; and a local language receiver provided in the apparatus main body configured to receive the selection of a local language used at the place of installation of the apparatus from a plurality of languages;

said print controller causes the character string data for the sightseeing guide stored in said tourist spot information storage device in the language designated by the language receiver and in the local language designated by the local language receiver to be included in a print data.

15. The tourist information guiding apparatus according to claim 14, wherein the display controller causes the monitor to display, for a plurality of tourist spots, a list of images relating to the respective tourist spots together with character strings for sightseeing guide written in the language designated by the language receiver.

16. The tourist information guiding apparatus according to claim 15, further comprising:

a charge receiving section for calculating an amount of money received from outside of said apparatus; and a charge calculating section for calculating a charge amount based on the print instruction received by said print instruction receiver and for issuing a permission signal when the charge receiving section receives said calculated charge amount.

* * * * *